UNITED STATES PATENT OFFICE.

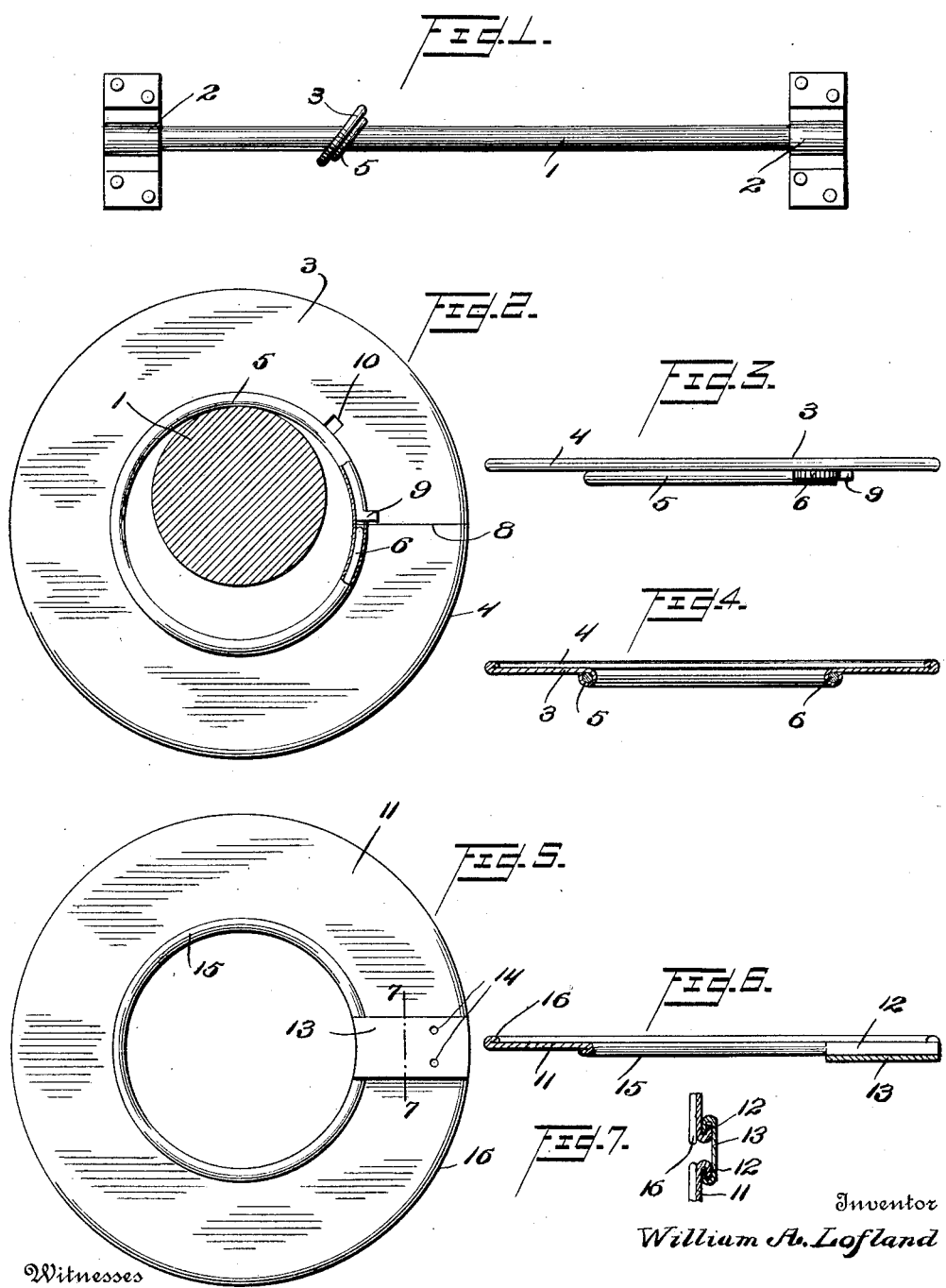

WILLIAM A. LOFLAND, OF CAMDEN, NEW JERSEY.

SHAFT-WIPING RING.

1,086,458.  Specification of Letters Patent.  Patented Feb. 10, 1914.

Application filed November 20, 1911. Serial No. 661,241.

*To all whom it may concern:*

Be it known that I, WILLIAM A. LOFLAND, a citizen of the United States, residing at Camden, in the county of Camden and State of New Jersey, have invented certain new and useful Improvements in Shaft-Wiping Rings, of which the following is a specification.

My invention relates to improvements in shaft wiping rings, the object of the invention being to provide a ring which is adapted to be positioned upon a line shaft, and which is caused to turn by the movement of the shaft, so that the ring not only turns on the shaft, but moves longitudinally of the shaft backwardly and forwardly so as to maintain the shaft free from lint, dust, and other foreign matter.

A further object is to provide a ring of this character which may be readily inserted on a shaft without disconnecting the shaft, and which may be readily removed and replaced as occasion may require.

With these and other objects in view, the invention consists in certain novel features of construction and combinations and arrangements of parts, as will be more fully hereinafter described and pointed out in the claim.

In the accompanying drawings Figure 1, is a plan view illustrating my improvements. Fig. 2, is a view in section through the shaft showing one form of my improved ring in elevation partly broken away. Fig. 3, is an edge view of the ring shown in Fig. 2. Fig. 4, is a view in section of the ring shown in Fig. 2. Fig. 5, is a view in elevation of a modified form of ring. Fig. 6, is a view in cross section of the ring shown in Fig. 5, and Fig. 7, is a view in section on the line 7—7 of Fig. 5.

1, represents a line shaft, and 2 bearings supporting the same.

Referring to the ring shown in Figs. 1 to 4 inclusive, 3 represents the ring proper which is preferably of sheet metal having its outer edge turned back forming a bed 4, and its inner edge turned in the opposite direction forming a tubular casing 5 for a locking wire 6. This locking wire is in the form of a ring with its ends apart, and this space between the ends of the ring is adapted to register with a slit 8 in the ring, so that the respective ends of this split ring may be separated so as to position the ring on the shaft. After it is on the shaft, the locking wire 6 is moved by means of a radially projecting lug 9 on one end of said wire, so as to move the wire across the split 8, securely holding the split ends of the ring together.

To prevent any accidental movement of the locking wire, a notch 10 is pressed into the sheet metal ring 3, and the lug 9 is sprung into this notch 10. It is, of course, to be understood that the turned over edge 5 is slotted longitudinally to allow the movement of this lug 9 in adjusting the wire either to locked or unlocked position.

By reference particularly to Fig. 2, it will be noted that the opening in the ring 3 is of appreciably greater diameter than the shaft 1. This causes the ring to assume a position at an angle greater than a right angle to the shaft 1, as shown in Fig. 1. As the shaft 1 revolves, it causes the ring 3 to turn by reason of the frictional contact of the ring with the shaft.

Due to the angular position of the ring, the rotary motion imparted thereto causes the ring to move longitudinally of the shaft until it engages one of the bearings 2. As soon as it engages the bearing, the angle of the ring will be changed, so that the ring will begin its journey along the shaft in the opposite direction. The ring therefore will continue to move along the shaft, revolving with the shaft, and will automatically shift and move backwardly and forwardly keeping the shaft clean.

In Figs. 5, 6, and 7, I illustrate a modification in which the ring 11 at its split end is provided with backwardly bent flanges 12 over which a channel shaped slide 13 is moved to hold the ring ends together. This slide 13, and the flanges 12, are made with registering indentations 14 to hold the slide 13 against accidental movement. This ring 11 is provided around the wall of its central opening with a bead 15, and at its outer edge with a bead 16, and various other changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

As a new article of manufacture, a shaft cleaning ring comprising a disk of sheet metal having a central opening of greater diameter than the shaft upon which it is to be supported, the wall of said opening being formed by turning back the metal of the ring to one side of the plane of the disk, said ring being split radially, and means for securing together the ends of said split ring, substantially as described.

In testimony whereof I have signed my name to this specification in the presence of two subscribing witnesses.

WILLIAM A. LOFLAND.

Witnesses:
R. H. KRENKEL,
CHAS. E. POTTS.

Copies of this patent may be obtained for five cents each, by addressing the "Commissioner of Patents. Washington, D. C."